March 24, 1959   R. R. FARRELL   2,878,896
LUBRICANT FITTING
Filed Oct. 5, 1955
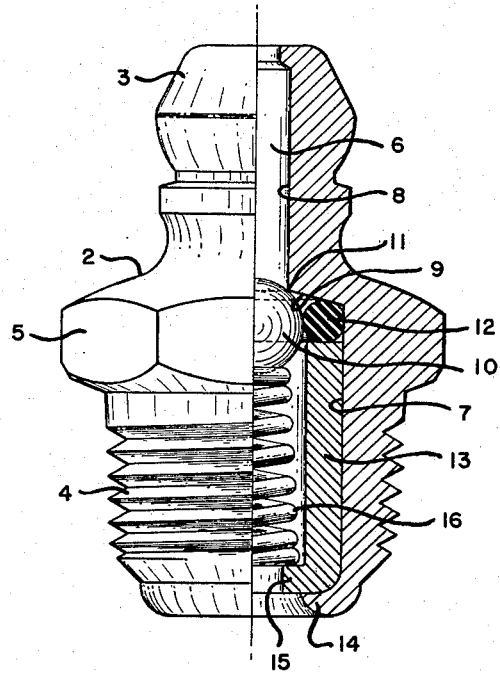
INVENTOR
Richard R. Farrell

United States Patent Office 2,878,896
Patented Mar. 24, 1959

2,878,896

LUBRICANT FITTING

Richard R. Farrell, Aspinwall, Pa., assignor to Universal Lubricating Systems, Inc., Oakmont, Pa., a corporation of Delaware Application October 5, 1955, Serial No. 538,755

2 Claims. (Cl. 184—105)

This invention relates to a lubricant fitting and particularly to a lubricant fitting of the so-called "leakproof" type especially adapted for use when even a small amount of leakage through the fitting is undesirable. Fittings of the type with which the invention is concerned are used, for example, in the aircraft industry, the food industry and in other applications where substantially absolute leakproofness is desired.

My lubricant fitting comprises a body having therein a valve seat and a valve adapted to engage the seat to close a lubricant passage through the body together with a sealing member other than the valve seat for sealing the valve to the body whereby the lubricant passage through the body is doubly closed, first by the valve seating against the valve seat and second by the valve being sealed to the body by means of the sealing member. Desirably the sealing member is annular, especially when the valve is of the ball type. It is adapted to seal against the valve at a portion of the valve other than the portion of the valve which engages the valve seat whereby to accomplish the double closure of the fitting.

My improved leakproof lubricant fitting comprises a body having a lubricant passage therethrough including a valve seat, a valve positioned to engage the valve seat and an annular resilient sealing member within and in engagement with the body and positioned to be engaged by the valve when the valve is in engagement with the valve seat to effect a seal between the valve and the body in addition to the closure effected by seating of the valve on the valve seat. I preferably employ a ball valve and position the annular resilient sealing member to substantially receive the ball valve therein to seal thereagainst.

The lubricant passage through the body of the fitting preferably includes an annular internal shoulder a portion of which forms the valve seat, and the annular resilient sealing member preferably lies against the shoulder. I preferably provide means opposed to the shoulder maintaining the annular resilient sealing member in position so that when the ball valve is in engagement with the valve seat it is substantially received within the annular resilient sealing member in sealing relationship thereto.

Desirably a sleeve is positioned in the body and has its inner end opposed to the shoulder cooperating with the shoulder to maintain the annular resilient sealing member in position. The end of the body may be deformed inwardly to maintain the sleeve in place therein. The sleeve may have an inward projection spaced from its inner end and a spring may be provided bearing between that projection and the ball valve resiliently urging the ball valve into engagement with the valve seat. The shoulder is preferably inclined inwardly and in the direction away from the ball valve.

The annular resilient sealing member is preferably in the form of an O ring disposed within and in engagement with the body and positioned to substantially receive the ball valve therein to seal thereagainst when the ball valve is in engagement with the valve seat, the median plane of the O ring being slightly to the seat side of the center of the ball valve when the ball valve is in engagement with the valve seat and with the O ring. The external diameter of the O ring in repose is preferably slightly greater than the internal diameter of the portion of the lubricant passage in the body in which the O ring is disposed so that the O ring is slightly radially compressed when it is introduced into the lubricant passage in the body. The O ring is preferably positioned to substantially receive the ball valve therein to seal thereagainst in the general region of the circumference of the ball valve when the ball valve is in engagement with the valve seat, the internal diameter of the O ring when in position in the lubricant passage in the body preferably being slightly less than the external diameter of the ball valve so that the ball valve seals within the O ring when a portion of the surface of the ball valve approaching the circumference of the ball valve seats within the O ring.

Other details, objects and advantages of the invention will become apparent as the following description of a present preferred embodiment thereof proceeds.

In the accompanying drawing I have shown a present preferred embodiment of the invention, the drawing being a view half in elevation and half in axial cross section of a leakproof lubricant fitting embodying my invention.

Referring now more particularly to the drawing, the fitting comprises a body designated generally by reference numeral 2 having the usual head 3 for receiving a connection from a grease gun or other source of lubricant under pressure and a screw threaded portion 4 whereat the fitting is adapted to be threaded into a machine or part to be lubricated. The central portion of the body is enlarged and formed with substantially flat faces 5 to facilitate application and removal of the fitting by means of a wrench or other appropriate tool. The portions of the fitting which have been described in this paragraph may be conventional.

The body 2 has a lubricant passage extending axially therethrough from end to end. The lubricant passage is designated generally by reference numeral 6. The passage through the body comprises a portion 7 of relatively great diameter and a portion 8 of relatively small diameter with a shoulder 9 between the portions 7 and 8 as shown. The shoulder 9 is preferably inclined inwardly and in the direction away from the ball valve presently to be referred to; it is so shown in the drawing.

The valve of the fitting may take various forms but I prefer to employ a valve in the form of a ball or sphere. Such a valve is shown at 10 in the drawing. It is adapted to seat against the inner annular extremity of the shoulder 9, such inner annular extremity or seat being designated 11.

An annular resilient sealing member 12 is provided, such sealing member being shown as an O ring of material such as neoprene, Buna-N or other similar material. The O ring is itself circular and also is of circular cross section as shown in the drawing. It is inserted into the body in position, as shown, to seat against the shoulder 9 and to seal within the enlarged portion 7 of the lubricant passage 6. The external diameter of the O ring in repose is slightly greater than the internal diameter of the portion 7 of the lubricant passage so that the O ring is slightly radially compressed when it is introduced into the lubricant passage in the body. The O ring 12 is positioned, as shown, to substantially receive the ball valve therein to seal thereagainst in the general region of the circumference thereof when the ball valve is in engagement with the valve seat. The median plane of the O ring 12 is slightly to the seat side of the center of the ball valve 10 when the ball valve is in engagement with the valve seat 11 and with the O ring 12 as shown in the drawing. The internal diameter of the O ring 12 when in position in the lubricant passage in the body is slightly less than the external diameter of the ball valve so that the ball valve seals within the O ring when a portion of the surface of the ball valve approaching the circumference of the ball valve seats within the O ring.

A sleeve 13 is introduced into the portion 7 of the passage in the body 2 so as to have its inner end opposed to the shoulder 9 and cooperating therewith to maintain the O ring 12 in position as shown. The end of the body may be deformed inwardly after insertion of the sleeve 13 as shown at 14 to maintain the sleeve in place in the body. The sleeve has an inward annular flange 15 at its outer end. A compression coil spring 16 bears between the flange 15 and the ball valve 10 resiliently urging the ball valve into engagement with the valve seat 11.

When lubricant is passed through the fitting under pressure in normal use of the fitting the lubricant enters through the portion 8 of the lubricant passage 6 and unseats the valve 10 by forcing it downwardly viewing the drawing, compressing the spring 16. The valve 10 not only becomes unseated from the seat 11 but also as it moves downwardly parts from the O ring 12 so that the lubricant passes through the valve seat and through the opening in the O ring between the body of the O ring and the ball valve 10. Upon release of pressure forcing lubricant through the fitting the ball valve 10 is returned to its seat 11 by the spring 16, any back pressure of lubricant below the valve also assisting in seating the valve. Since the internal diameter of the O ring when in position in the body as shown is slightly less than the external diameter of the ball valve 10 the ball valve when seating against the seat 11 and with a portion thereof approaching its circumference pressed against the inside of the O ring somewhat deforms the O ring to effect a seal supplementing the closure of the fitting at the valve seat 11 where the valve 10 cooperates with the seat.

Thus a very effective double closure with a tight seal afforded by the O ring between the valve and the body of the fitting is accomplished. At the same time the fitting is of relatively simple construction and easy and inexpensive to manufacture and assemble.

While I have shown and described a present preferred embodiment of the invention it is to be distinctly understood that the invention is not limited thereto but may be otherwise variously embodied within the scope of the following claims.

I claim:

1. A lubricant fitting comprising a body having a lubricant passage therethrough including a head for receiving a connection from a source of lubricant under pressure to deliver lubricant to the lubricant passage and an annular internal shoulder a portion of which forms a valve seat, a ball valve positioned to engage the valve seat, an annular resilient sealing member within the body and lying against the shoulder, a sleeve in the body having its inner end opposed to the shoulder cooperating with the shoulder to maintain the annular resilient sealing member in position so that when the ball valve is in engagement with the valve seat it is substantially received within the annular resilient sealing member in sealing relationship thereto, the sleeve having an inward projection spaced from its inner end, and a spring bearing between said projection and the ball valve resiliently urging the ball valve into engagement with the valve seat, the end of the body being deformed inwardly to maintain the sleeve in place therein.

2. A lubricant fitting comprising a body having a lubricant passage therethrough including a head for receiving a connection from a source of lubricant under pressure to deliver lubricant to the lubricant passage and an annular internal shoulder a portion of which forms a valve seat, a ball valve positioned to engage the valve seat, the shoulder being inclined inwardly and in the direction away from the ball valve, an O ring within and in engagement with the body and lying against the shoulder, the internal diameter of the O ring in repose being slightly greater than the internal diameter of the portion of the lubricant passage in the body in which the O ring is disposed so that the O ring is slightly radially compressed when it is introduced into the lubricant passage in the body, a sleeve in the body having its inner end opposed to the shoulder cooperating with the shoulder to maintain the O ring in position so that when the ball valve is in engagement with the valve seat it is substantially received within the O ring in sealing relationship thereto at the general region of the circumference of the ball valve, the internal diameter of the O ring when in position in the lubricant passage in the body being slightly less than the external diameter of the ball valve so that the ball valve seals within the O ring when a portion of the surface of the ball valve approaching the circumference of the ball valve seats within the O ring, the sleeve having an inward projection spaced from its inner end, and a spring bearing between said projection and the ball valve resiliently urging the ball valve into engagement with the valve seat, the end of the body being deformed inwardly to maintain the sleeve in place therein.

References Cited in the file of this patent

UNITED STATES PATENTS

| | | |
|---|---|---|
| 1,375,497 | Eickman | Apr. 19, 1921 |
| 1,380,415 | Putnam | June 7, 1921 |
| 2,016,809 | Bystricky | Oct. 8, 1935 |
| 2,381,484 | Blank | Aug. 7, 1945 |
| 2,400,817 | Fox | May 21, 1946 |
| 2,551,045 | Parker | May 1, 1951 |
| 2,556,308 | Weatherhead | June 12, 1951 |
| 2,645,449 | Gulick | July 14, 1953 |
| 2,673,062 | Cornelius | Mar. 23, 1954 |
| 2,676,782 | Bostock | Apr. 27, 1954 |
| 2,745,432 | Williams | May 15, 1956 |

FOREIGN PATENTS

| | | |
|---|---|---|
| 12,911 | Great Britain | June 7, 1904 |